(12) United States Patent
Cho et al.

(10) Patent No.: US 11,646,425 B2
(45) Date of Patent: May 9, 2023

(54) BATTERY AND MOBILE ELECTRONIC DEVICE INCLUDING SAME

(71) Applicant: AMOGREENTECH CO., LTD., Gimpo-si (KR)

(72) Inventors: Jun Keun Cho, Suwon-si (KR); Kyung Pyo Hong, Suwon-si (KR); Dong Woo Kim, Cheonan-si (KR); Seung Gon Park, Cheonan-si (KR); Seung Yun Roh, Hwaseong-si (KR)

(73) Assignee: Amogreentech Co., Ltd., Gimpo-si (KR)

( * ) Notice: Subject to any disclaimer, the term of this patent is extended or adjusted under 35 U.S.C. 154(b) by 276 days.

(21) Appl. No.: 16/605,050

(22) PCT Filed: Apr. 20, 2018

(86) PCT No.: PCT/KR2018/004602
§ 371 (c)(1),
(2) Date: Oct. 14, 2019

(87) PCT Pub. No.: WO2018/194415
PCT Pub. Date: Oct. 25, 2018

(65) Prior Publication Data
US 2021/0028464 A1    Jan. 28, 2021

(30) Foreign Application Priority Data
Apr. 20, 2017   (KR) .................. 10-2017-0051035

(51) Int. Cl.
*H01M 4/70*    (2006.01)
*H01M 4/62*    (2006.01)
(Continued)

(52) U.S. Cl.
CPC .............. *H01M 4/70* (2013.01); *H01M 4/62* (2013.01); *H01M 10/0436* (2013.01);
(Continued)

(58) Field of Classification Search
CPC ....... H01M 4/62; H01M 4/661; H01M 50/105
See application file for complete search history.

(56) References Cited

U.S. PATENT DOCUMENTS

| 6,306,215 B1* | 10/2001 | Larkin | H01M 4/04 |
| | | | 118/249 |
| 2008/0138702 A1* | 6/2008 | Nakamura | H01M 10/0587 |
| | | | 429/163 |

(Continued)

FOREIGN PATENT DOCUMENTS

| KR | 20020063020 A | 8/2002 |
| KR | 20030065074 A | 8/2003 |

(Continued)

OTHER PUBLICATIONS

Polypropylene, Wikipedia, https://en.wikipedia.org/wiki/Polypropylene, accessed Jul. 13, 2022, 20 pages.

(Continued)

*Primary Examiner* — Brittany L Raymond
(74) *Attorney, Agent, or Firm* — Rothwell, Figg, Ernst & Manbeck, P.C.

(57) ABSTRACT

A battery having an electrode assembly comprising a cathode having a cathode collector coated, partially or entirely, with a cathode active material, an anode having a nano-web layer on both sides of an anode collector coated, partially or entirely, with an anode active material, and a separation membrane interposed between the cathode and the anode; an electrolytic solution; and an exterior material which encapsulates the electrolyte solution and the electrode assembly together. Since the battery has a porous nano-web layer, even if the temperature inside the battery increases to cause shrinkage or melting of the separation membrane, a contact between the cathode and the anode is prevented such that ignition and/or explosion of the battery does not occur, ion exchange is not disturbed such that the battery performance (Continued)

does not deteriorate, and the nano-web layer is not molten or released towards the separation membrane even at high temperatures.

14 Claims, 9 Drawing Sheets

(51) Int. Cl.
    *H01M 10/04*     (2006.01)
    *H01M 50/126*     (2021.01)
    *H01M 50/105*     (2021.01)

(52) U.S. Cl.
    CPC ....... *H01M 50/105* (2021.01); *H01M 50/126* (2021.01); *H01M 2220/30* (2013.01)

(56) References Cited

U.S. PATENT DOCUMENTS

| | | | |
|---|---|---|---|
| 2009/0186276 A1* | 7/2009 | Zhamu | H01M 4/131 429/221 |
| 2012/0058387 A1* | 3/2012 | Ahn | H01M 50/116 429/163 |
| 2013/0078527 A1* | 3/2013 | Lee | D04H 3/016 264/465 |
| 2017/0373338 A1* | 12/2017 | Teranishi | H01M 50/409 |

FOREIGN PATENT DOCUMENTS

| | | |
|---|---|---|
| KR | 20160042799 A | 4/2016 |
| KR | 20160069386 A | 6/2016 |
| KR | 20160090104 A | 7/2016 |

OTHER PUBLICATIONS

Polyethylene, Wikipedia, https://en.wikipedia.org/wiki/Polyethylene, accessed Jul. 13, 2022, 21 pages.

Carbon Nanotubes, Single-walled, multi-walled, functionalized, coated CNTs, Explore Materials at the Nanoscale, American Elements, https://www.americanelements.com/carbon-nanotubes-308068-56-6, accessed Jul. 13, 2022, 10 pages.

\* cited by examiner

BATTERY AND MOBILE ELECTRONIC DEVICE INCLUDING SAME

CROSS-REFERENCE TO RELATED APPLICATIONS

This application is a 35 U.S.C. 371 National Phase Entry Application from PCT/KR2018/004602, filed Apr. 20, 2018, which claims the benefit of Korean Patent Application No. 10-2017-0051035 filed on Apr. 20, 2017, the disclosures of which are incorporated herein in their entirety by reference.

BACKGROUND

Technical Field

The present invention relates to a battery, and more particularly, to a battery and a mobile electronic device including the same.

As the demands of consumers have changed as a result of digitization and high performance of electronic products, market demands are also changing to development of power supply devices with high capacity due to thin profiles, weight reduction, and high energy density.

To meet such demands of the consumers, power supply devices, which include lithium-ion secondary batteries, lithium-ion polymer batteries, supercapacitors (e.g., electric double layer capacitors and pseudo capacitors), and the like which have high energy density and large capacity, are being developed.

In recent years, demands for mobile electronic devices including portable telephones, notebook computers, digital cameras, and the like are continuously increasing, and particularly, interest in flexible mobile electronic devices, to which roll-type displays, flexible e-papers, flexible liquid crystal displays (LCDs), flexible organic light-emitting diodes (OLEDs), and the like are applied, is increasing. Consequently, it is also needed for power supply devices for the flexible mobile electronic devices to have a flexible characteristic.

Therefore, in recent years, the development of pouch-type batteries, which are made of a material having flexibility, are manufacturable in various forms, and are capable of implementing a high energy density per mass, is underway.

Recently, in some cases, the above-described conventional pouch-type batteries are implemented in a flexible form to be applied to products. However, when repetitive bending occurs during usage, the pouch-type battery, which is commercially available or is being developed, has a problem in that an exterior material and an electrode assembly are damaged due to repetitive shrinkage and relaxation, or the performance of the pouch-type battery is significantly reduced compared with an original design value so that there is a limit for the pouch-type battery in serving as a battery, a problem in that ignition and/or explosion occurs due to a contact between an anode and a cathode resulting from damage or a low melting point, and a problem in that ion exchange of an electrolytic solution in the pouch-type battery is not easy.

Further, recently, even in the case of a battery which is not implemented in a flexible form, flexibility is lacking and damage due to an external force cannot be prevented. Accordingly, there is a problem in that ignition and/or explosion occurs due to a contact between an anode and a cathode resulting from damage or a low melting point, and a problem in that ion exchange of an electrolytic solution in the battery is not easy.

Thus, there is an urgent need for research on a battery in which, even when a temperature in a battery rises and thus shrinkage or melting of a separation membrane occurs, a contact between a cathode and an anode is prevented so that ignition and/or explosion does not occur and ion exchange is not disturbed such that the performance of the battery is not degraded, and, even when bending occurs, occurrence of cracks can be prevented, and, even when repetitive bending occurs, degradation in physical characteristics required as a battery can be prevented or minimized.

SUMMARY OF THE INVENTION

The present invention is directed to providing a battery in which, even when a temperature in the battery rises and thus shrinkage or melting of a separation membrane occurs, a contact between a cathode and an anode is prevented so that ignition and/or explosion does not occur and ion exchange is not disturbed such that performance of the battery is not degraded.

The present invention is also directed to providing a battery in which a nano-web layer is not melted and released to a separation membrane even at a high temperature.

The present invention is also directed to providing a battery in which, even when an external force is applied to the battery, occurrence of cracks may be prevented, and, even when an repetitive external force such as a repetitive vibration is applied, degradation in physical characteristics required as a battery may be prevented or minimized, and a mobile electronic device including the same.

Technical Solution

One aspect of the present invention provides a battery including an electrode assembly which includes a cathode having a cathode collector which is partially or entirely coated with a cathode active material, an anode having nano-web layers provided on both surfaces of an anode collector which is partially or entirely coated with an anode active material, and a separation membrane interposed between the cathode and the anode, an electrolyte, and an exterior material configured to encapsulate the electrolyte together with the electrode assembly.

The nano-web layers may be directly attached to the both surfaces of the anode collector which is partially or entirely coated with the anode active material.

The nano-web layer may be fixed through an adhesive web layer interposed between the nano-web layer and the anode collector which is partially or entirely coated with the anode active material.

The adhesive web layer may be formed of an adhesive fiber including a polymer resin containing polyvinylidene fluoride (PVDF) and an acrylic-based adhesive.

A thickness of the adhesive web layer may range from 0.5 µm to 5 µm.

The adhesive fiber may contain the acrylic-based adhesive ranging from 300 to 700 parts by weight based on 100 parts by weight of the polymer resin.

The anode may be formed by performing a lamination process in which a stacked part, in which an adhesive web layer is further disposed between the nano-web layer and the anode collector partially or entirely coated with an anode active material, passes through a roll gap between an upper roll and a lower roll, wherein the roll gap corresponds to 60 to 85% of a thickness of the stacked part A basis weight of the nano-web layer may be greater than or equal to 1.5 g/m$^2$.

A thickness of the nano-web layer may range from 3 μm to 15 μm.

Air porosity of the nano-web layer may range from 20% to 70%.

The nano-web layer may be formed of nanofibers which have an average diameter ranging from 100 nm to 1000 nm and contains a polyacrylonitrile (PAN) material.

The cathode active material and the anode active material may contain one or more selected from the group consisting of PVDF and polytetrafluoroethylene (PTFE), which serve as a binder so as to prevent delamination of the cathode active material and the anode active material from the cathode collector and the anode collector, in a range of 4 to 8% by weight based on a total weight of each of the cathode active material and the anode active material.

A thickness of the cathode collector may range from 10 to 30 μm, and a thickness of the anode collector may range from 3 to 18 μm.

The separation membrane may be provided such that a continuous separation membrane surrounds one end of the anode and one end of the cathode in a direction opposite to the one end of the anode.

The exterior material may be formed by sequentially stacking a first resin layer, a metal layer, and a second resin layer, and the second resin layer may be exposed to the outside.

Each of the electrode assembly and the exterior material may be formed such that patterns for shrinkage and relaxation in a length direction are formed to have the same orientation during bending, wherein the patterns may include a first pattern formed on at least one surface of the exterior material, and a second pattern formed on the electrode assembly in the same direction as the first pattern and disposed to coincide with the first pattern.

Another aspect of the present invention provides a mobile electronic device including the above-described battery.

Advantageous Effects

In a battery according to the present invention, a porous nano-web layer is provided so that, even when a temperature in the battery rises and thus shrinkage or melting of a separation membrane occurs, a contact between a cathode and an anode is prevented such that ignition and/or explosion cannot occur, and ion exchange cannot be disturbed such that degradation of battery performance can be prevented. Further, the nano-web layer cannot be melted and released to the separation membrane even at a high temperature, and, even when an external force is applied to the battery, occurrence of cracks can be prevented, and, even when an repetitive external force such as a repetitive vibration is applied, degradation in physical characteristics required as a battery can be prevented or minimized. The battery according to the present invention can be applied to not only wearable devices such as smart watches, watch straps, and the like but also a variety of electronic devices such as a rollable display and the like which require flexibility of a battery.

DETAILED DESCRIPTION

Figure 1:
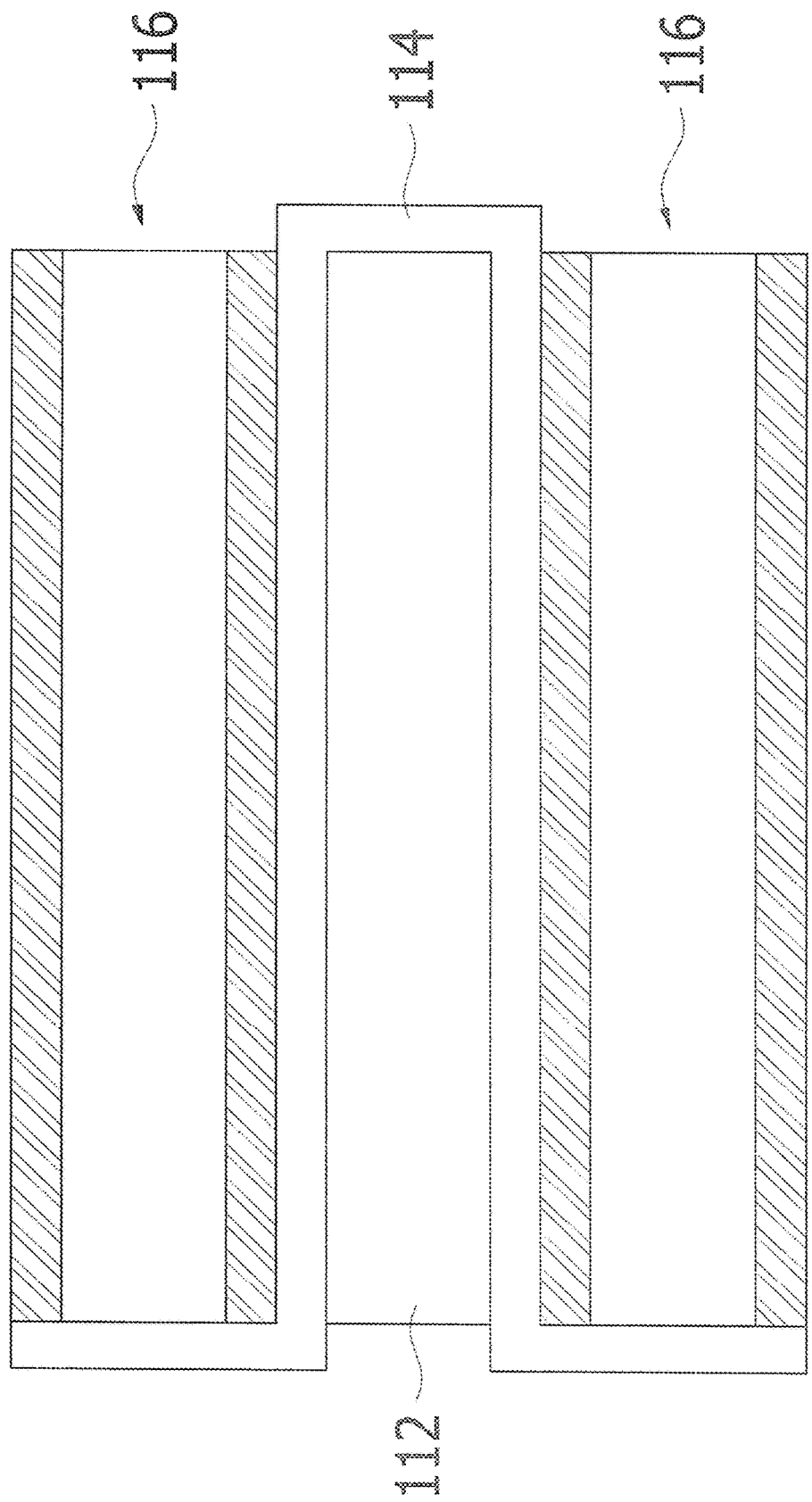
FIG. 1 is a cross-sectional view of an electrode assembly provided in a battery according to one embodiment of the present invention.

Hereinafter, embodiments of the present invention will be fully described in detail which is suitable for easy implementation by those skilled in the art to which the present invention pertains with reference to the accompanying drawings. The present invention may be implemented in various different forms, and thus it is not limited to embodiments which will be described herein. In the drawings, some portions not related to the description will be omitted in order to clearly describe the present invention, and the same or similar reference numerals are given to the same or similar components throughout this disclosure.

As shown in FIG. 1, a battery 100 according to one embodiment of the present invention includes an electrode assembly which has a cathode 112, an anode 116 having nano-web layers on both surfaces thereof, and a separation membrane 114 interposed between the cathode 112 and the anode 116.

Meanwhile, a battery according to an embodiment of the present invention may be implemented as a flexible battery, which will be described below, having a predetermined pattern shown in FIGS. 2 and 3 or implemented as a general pouch-type battery shown in FIG. 4.

First, the separation membrane 114 interposed between the cathode 112 and the anode 116 will be described.

The separation membrane 114 is interposed between the cathode 112 and the anode 116. As shown in FIG. 1, the separation membrane may be provided such that a continuous separation membrane is interposed between the cathode 112 and the anode 116 and, simultaneously, surrounds one end of the anode 116 and one end of the cathode 112 which is in a direction opposite to the one end of the anode. The continuous separation membrane is provided to surround the one end of the anode 116 and the one end of the cathode 112 which is in a direction opposite to the one end of the anode such that the cathode 112 may be completely separated from the anode 116 by including side ends of the cathode 112 and the anode 116. Consequently, ignition and/or explosion due to a contact between the cathode 112 and the anode 116 may be prevented The separation membrane 114 may be used without limitation as long as it can be generally used as a separation membrane in the art. Preferably, the separation membrane 114 may be a porous non-woven fabric layer. A non-woven fabric constituting the separation membrane 114 may employ one or more selected from the group consisting of cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), polymethylmethacrylate (PMMA), and polyacrylonitrile, preferably, employ one or more selected from the group consisting of PE, PP, and PET, and more preferably, employ PE or PP.

Meanwhile, the porous non-woven fabric layer may further include an inorganic additive. The inorganic additive may include one or more selected from among SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, and polytetrafluoroethylene (PTFE).

Further, an inorganic particle which is the inorganic additive may have an average particle diameter ranging from 10 to 50 nm, preferably, ranging from 10 to 30 nm, and more preferably, ranging from 10 to 20 nm.

Further, the separation membrane 114 may be formed to have an average thickness ranging from 15 to 30 μm and, preferably, ranging from 16 to 20 μm.

Next, the cathode 112 and the anode 116 included in the electrode assembly according to the present invention will be described.

Figure 2:
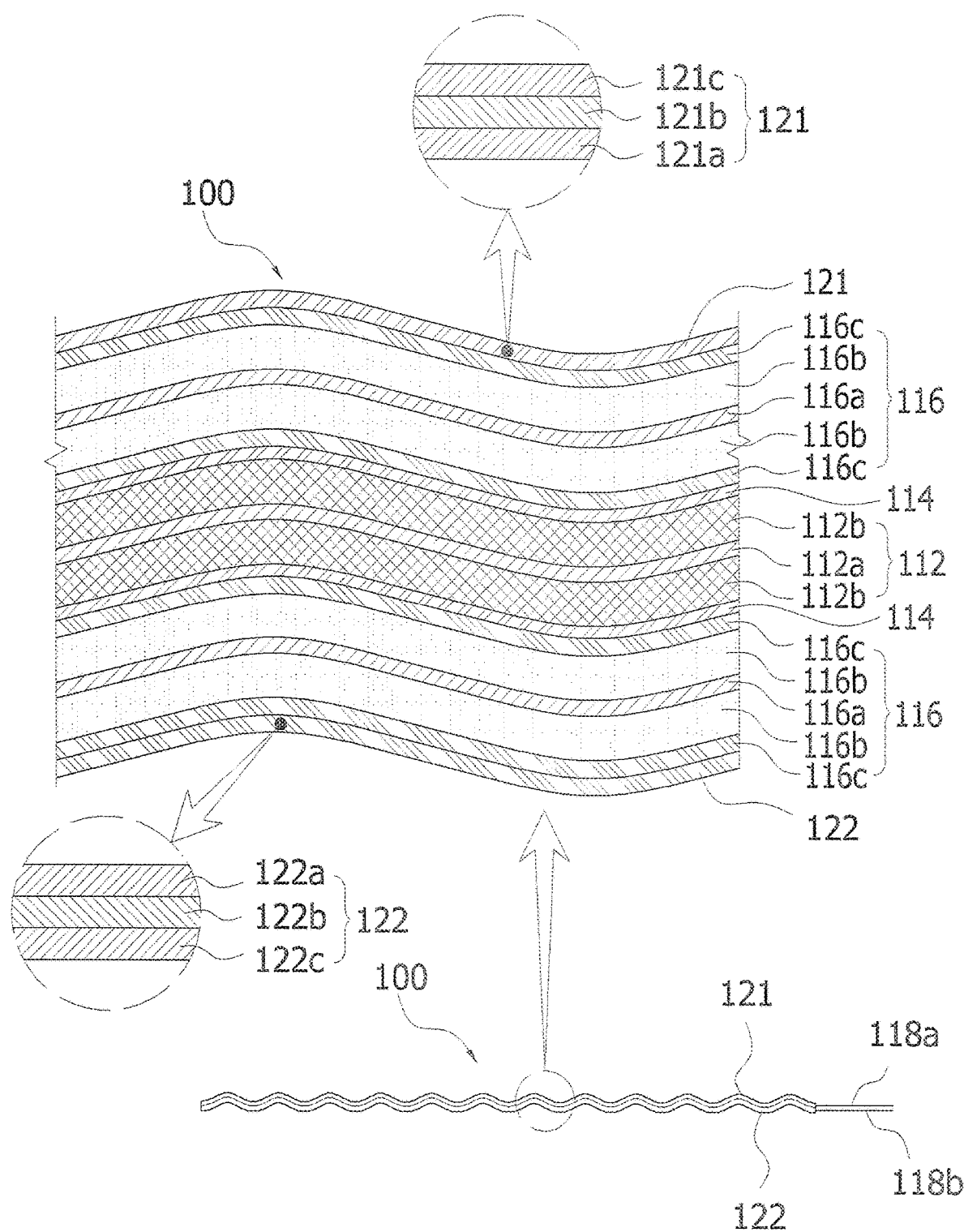
FIG. 2 is an enlarged view illustrating a detailed configuration of the battery according to one embodiment of the present invention.
Figure 3:
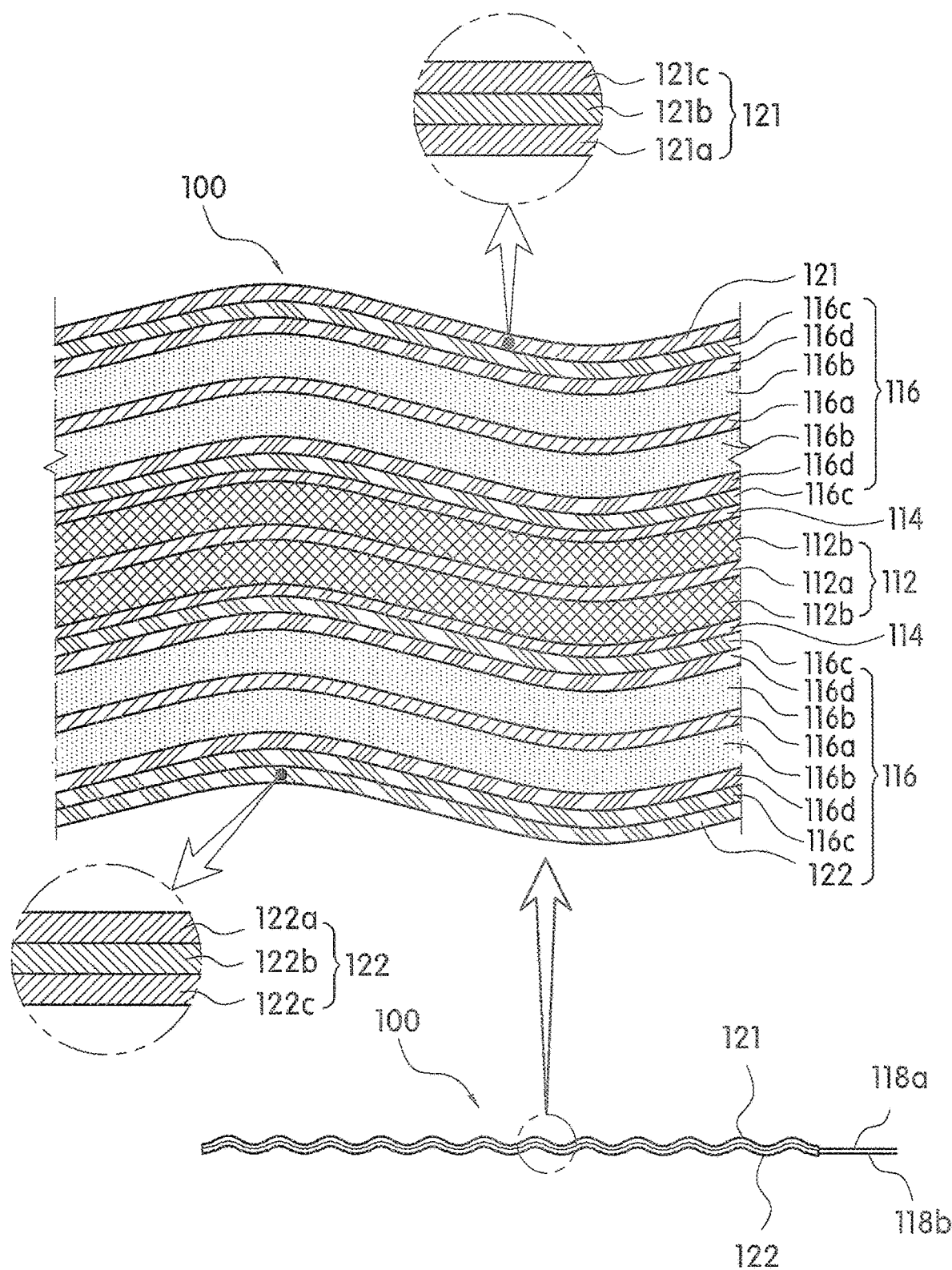
FIG. 3 is an enlarged view illustrating a detailed configuration of a battery according to another embodiment of the present invention.
Figure 4:
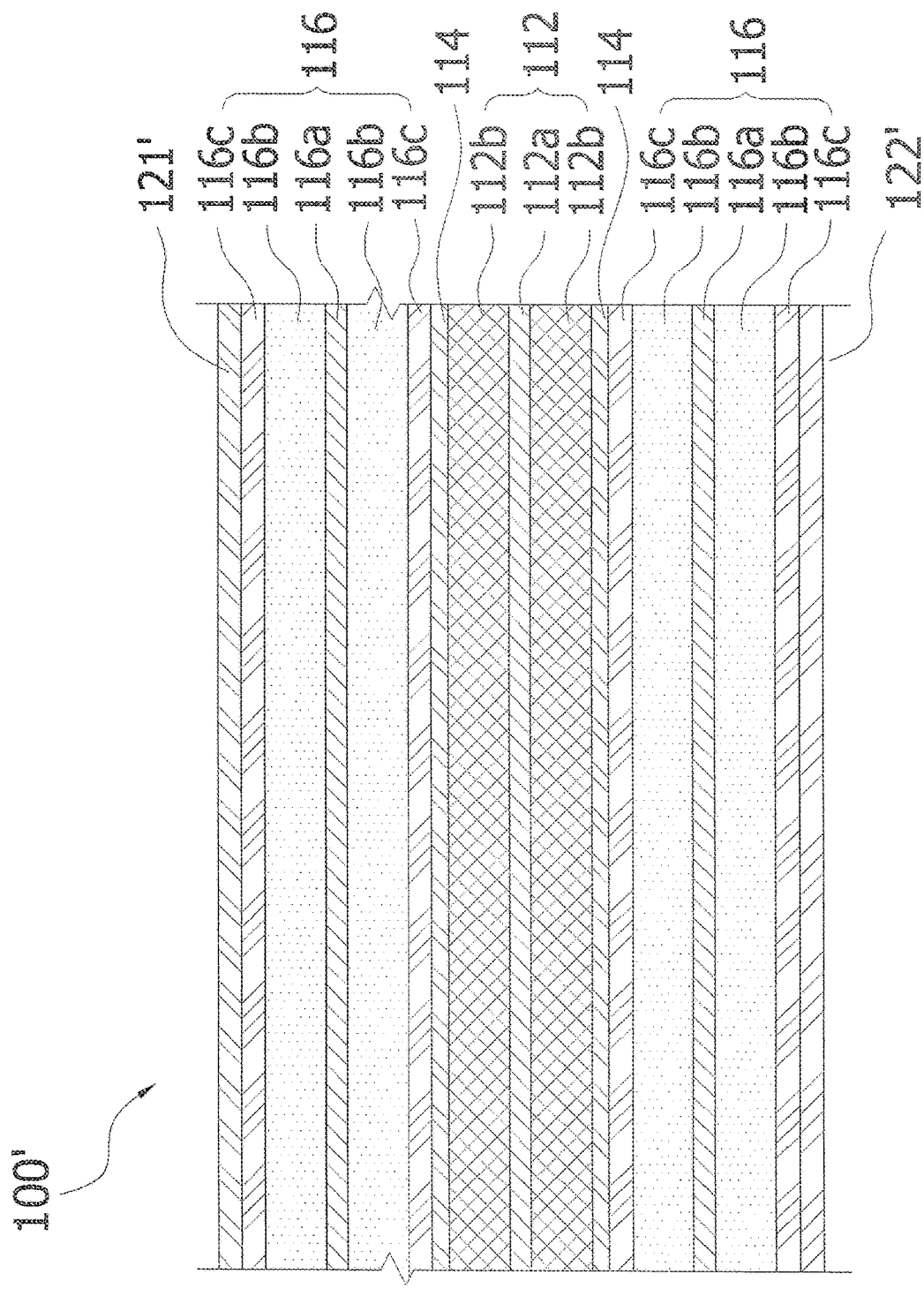
FIG. 4 is an enlarged view illustrating a detailed configuration of a battery according to still another embodiment of the present invention.

As shown in FIGS. 2 to 4, the cathode 112 may include a cathode collector 112a and a cathode active material 112b, the anode 116 may include an anode collector 116a and an anode active material 116b, and the cathode collector 112a and the anode collector 116a may be implemented in the form of a plate sheet having a predetermined area.

That is, the active materials 112b and 116b are pressed, deposited, or applied on one surface or both surfaces of the collectors 112a and 116a of the cathode 112 and the anode 116. In this case, the active materials 112b and 116b may be entirely or partially provided with respect to areas of the collectors 112a and 116a.

Here, the anode collector 116a and cathode collector 112a may be made of a thin metal foil or made of copper, aluminum, stainless steel, nickel, titanium, chromium, manganese, iron, cobalt, zinc, molybdenum, tungsten, silver, gold, or a mixture thereof.

Further, when the cathode collector 112a is implemented in a general battery and an external force is applied thereto and/or when the cathode collector 112a is implemented in a flexible battery and a pattern is formed thereon, in order to prevent occurrence of cracks of the cathode active material and the cathode collector, a thickness of the cathode collector 112a may range from 10 to 30 μm and, preferably, 15 to 25 μm. When the thickness of the cathode collector does not satisfy the above range, the cathode collector is implemented in a general battery, and an external force is applied to the cathode collector and/or when the cathode collector is implemented in a flexible battery and a pattern is formed thereon, cracks may occur in the cathode active material and the cathode collector.

Further, when the anode collector 116a is implemented in a general battery and an external force is applied thereto and/or when the anode collector 116a is implemented in a flexible battery and a pattern is formed thereon, in order to further prevent occurrence of cracks of the anode active material and the anode collector, a thickness of the anode collector 116a may range from 3 to 18 μm and, preferably, 6 to 15 μm. When the thickness of the anode collector 116a does not satisfy the above range, the cathode collector is implemented in a general battery, and an external force is applied to the cathode collector and/or when the anode collector 116a is implemented in a flexible battery and a pattern is formed thereon, cracks may occur in the anode active material and/or the anode collector.

Further, an anode terminal 118a and a cathode terminal 118b may be respectively formed on bodies of the cathode collector 112a and the anode collector 116a to be electrically connected to an external device. Here, the cathode terminal 118b and the anode terminal 118a may be provided in the form of extending from the cathode collector 112a and the anode collector 116a to protrude from one side of an exterior material 120 or provided in the form of being exposed at a surface of the exterior material 120.

Meanwhile, the cathode active material 112b includes a cathode active material capable of reversibly intercalating and deintercalating lithium ions. A typical example of the cathode active material may include one among a lithium-transition metal oxide, such as $LiCoO_2$, $LiNiO_2$, $LiNiCoO_2$, $LiMnO_2$, $LiMn_2O_4$, $V_2O_5$, $V_6O_{13}$, or $LiNi_{1-x-y}Co_xM_yO_2$ (0≤x≤1, 0≤y≤1, and 0≤x+y≤1, and M is a metal such as Al, Sr, Mg, La, or the like), and a lithium nickel cobalt manganese (NCM) active material, or include a mixture in which one or more thereof are mixed.

Further, the anode active material 116b includes an anode active material capable of reversibly intercalating and deintercalating lithium ions. The anode active material may be selected from the group consisting of a carbon anode active material including crystalline or amorphous carbon, a carbon fiber, or a carbon composite, a tin oxide, lithiation thereof, lithium, a lithium alloy, and a mixture in which one or more thereof are mixed. Here, carbon may be one or more materials selected from the group consisting of carbon nanotubes, carbon nanowires, carbon nanofibers, graphite, active carbon, graphene, and graphite.

However, the cathode active material and the anode active material used in the present invention are not limited thereto, and it is noted that both of all cathode active materials and anode active materials commonly used in the art may be used herein.

Meanwhile, the cathode active material 112b and the anode active material 116b may include one or more selected from the group consisting of polyvinylidene fluoride (PVDF) and PTFE as a binder. This is for, when a general battery is implemented and an external force is applied thereto and/or when a flexible battery is implemented and bent, preventing the cathode active material 112b and the anode active material 116b from being delaminated from the collectors 112a and 116a or from being cracked. The binder may be 4 to 8% by weight based on a total weight of each of the cathode active material 112b and the anode active material 116b.

Meanwhile, the battery 100 of the present invention may include two to ten cathodes 112 and three to 11 anodes 116, and the anode 116 may be provided with one more than the cathode 112.

Next, nano-web layers 116c provided to prevent a contact between the cathode 112 and the anode 116 will be described.

Even when the separation membrane is melted at a high temperature, the nano-web layer 116c serves to prevent a contact between the cathode 112 and the anode 116.

Figure 8:
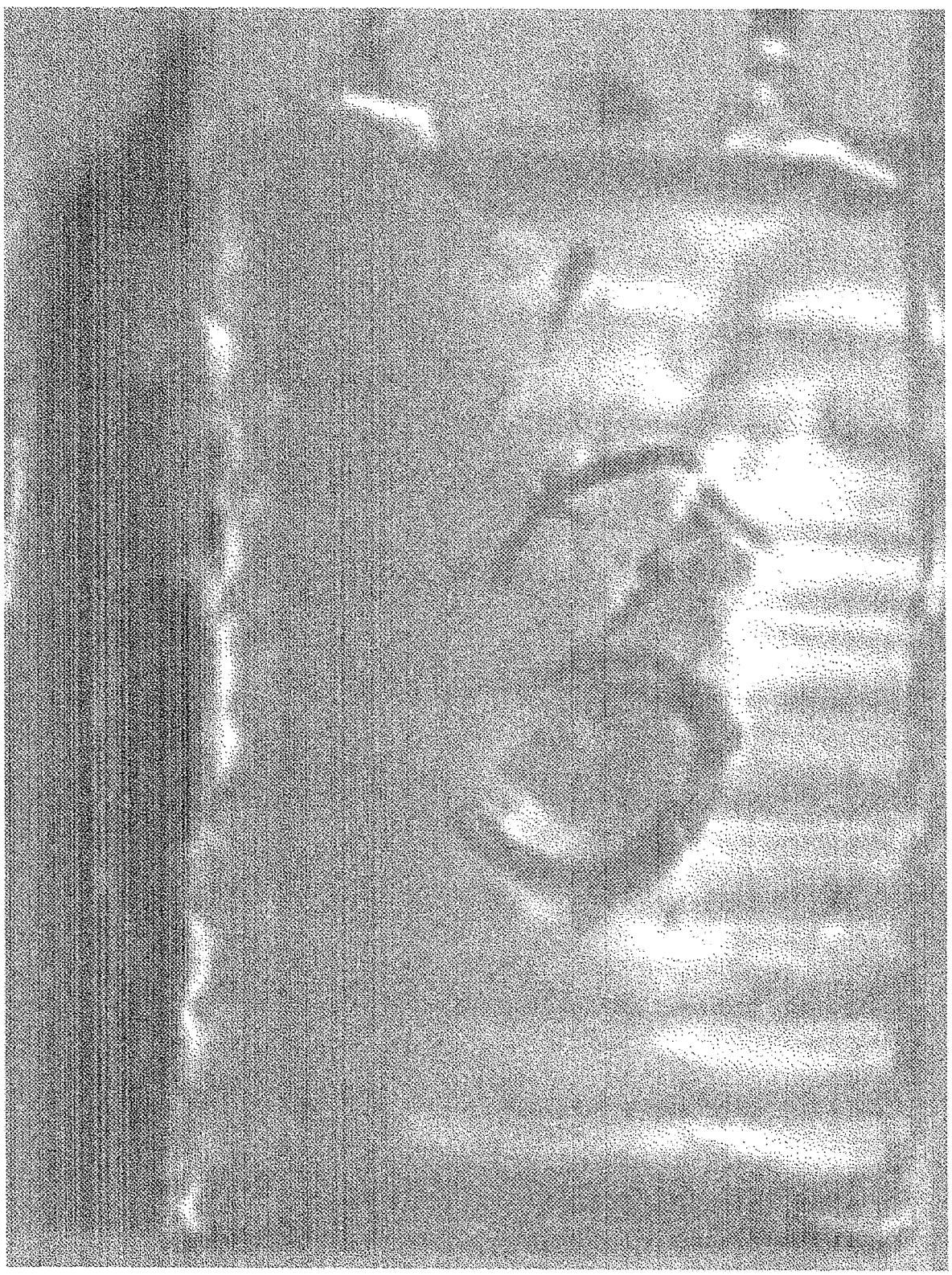
FIG. 8 is a photograph showing a result of an ignition test of the battery which is manufactured according to one embodiment of the present invention.
Figure 9:
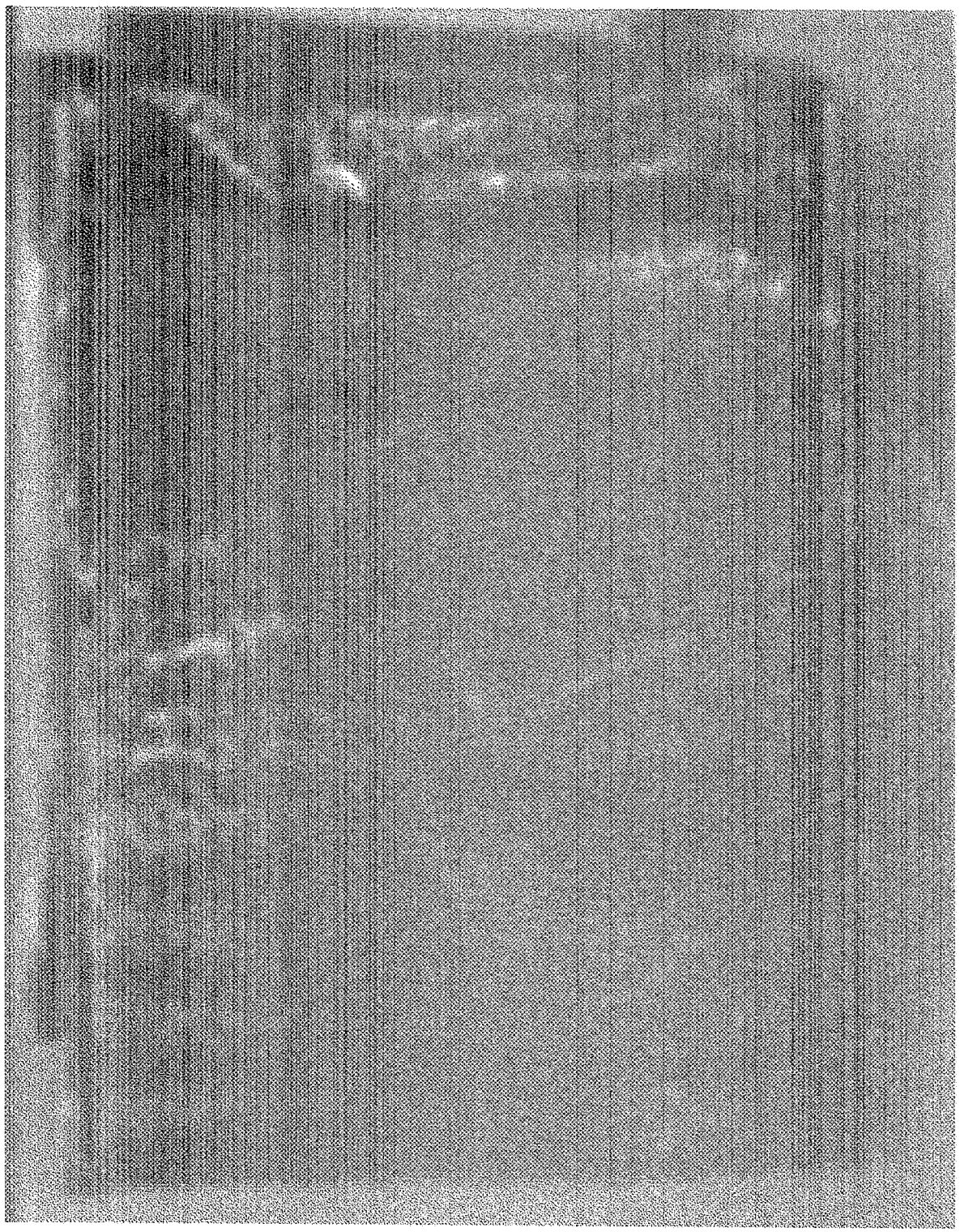
FIG. 9 is a photograph showing a result of an ignition test of a battery not including a nano-web layer according to the present invention.

The battery according to the present invention is implemented with the nano-web layers 116c on both surfaces of the anode 116. Therefore, it can be confirmed that, as shown in FIG. 8, when an ignition test was performed at a predetermined temperature (rising up to 250° C.), an ignition phenomenon did not occur and, as shown in FIG. 9, when an ignition test was performed on a battery which is implemented without the nano-web layer 116c, the ignition phenomenon occurred.

The nano-web layers 116c may be provided to be directly attached to the both surfaces of the anode 116. The nano-web layer 116c is provided by being directly attached to the anode 116 such that the nano-web layer 116c is not melted at a high temperature and released to the separation membrane 114. Consequently, a contact which may occur between the cathode 112 and the anode 116 may be further prevented.

The nano-web layers 116c may be formed by spinning a spinning solution including a polymer forming a nano-web layer on separate supports using an electrospinning device, arranging a nano-web on upper and lower surfaces of the anode 116, and then directly providing the nano-web layers on the upper and lower surfaces of the anode 116 through roll pressing. Alternatively, the nano-web layer 116c may be formed by spinning a spinning solution including a polymer forming a nano-web layer using an electrospinning device, directly forming adhesive layers on the nano-web layers 116c or separately forming the adhesive layers thereon, laminating the adhesive layer on one surface of the nano-web layer 116c, arranging the adhesive layers to face upper and lower surfaces of the anode 116, and providing the adhesive layers on the both surfaces of the anode 116.

The nano-web layer 116c may employ a polymer without limitation as long as the polymer can be dissolved in a solvent to form a spinning solution and then spun through an electrospinning method to form nanofibers. Preferably, the polymer may be one selected from the group consisting of a swellable polymer, a non-swellable polymer, a heat resistant polymer, and mixed polymers thereof. More preferably, the polymer may be one selected from the group consisting of a swellable polymer, a heat resistant polymer, and mixed polymers thereof. More preferably, the polymer may be a heat resistant polymer, and most preferably, polyacrylonitrile (PAN) may be used to secure radioactivity and uniform pore formation.

In this case, an average diameter of the nanofibers may range from 100 to 1000 nm and, preferably, 200 to 500 nm. When the average diameter of the nanofibers is less than 100 nm, there may be a problem in that the separation membrane does not secure sufficient heat resistance. When the average diameter thereof exceeds 1000 nm, an elastic force may be decreased.

Further, a basis weight of the nano-web layer 116c may be 1.5 g/m$^2$ or more and, preferably, may range from 1.7 to 4 g/m$^2$. When the basis weight of the nano-web layer 116c is less than 1.5 g/m$^2$, high thermal stability may not be high, ignition and/or explosion may occur due to a contact between an anode and a cathode, and shape retentivity may not be high. Further, a thickness of the nano-web layer 116c may range from 3 to 15 μm and, preferably, 4 to 13 μm. When the thickness of the nano-web layer 116c is less than 3 μm, the thickness of the nano-web layer 116c is excessively small such that ignition and/or explosion due to a contact between the anode and the cathode may not be prevented and it may be difficult to secure long-term durability. Further, when the thickness exceeds 15 μm, it may be disadvantageous in weight reduction and thinness of a battery and, when a general battery is implemented and an external force is applied thereto and/or when a flexible battery is implemented and a pattern is formed thereon, the nano-web layer may be delaminated from the anode.

Meanwhile, a melting point of the nano-web layer 116c may be a temperature of 250° C. or more and, preferably, may range from 260 to 300° C. When the melting point of the nano-web layer 116c is less than a temperature of 250° C., the nano-web layer 116c is melted at a high temperature exceeding 250° C. such that it is not possible to prevent the contact between the anode and the cathode. Consequently, ignition and/or explosion may occur.

Further, air porosity of the nano-web layer 116c may range from 20 to 70% and, preferably, from 40 to 55%. When the air porosity of the nano-web layer 116c is less than 20%, ion exchange may not be easy, and, when the air porosity thereof exceeds 70%, the basis weight is relatively decreased such that high thermal stability is not good, ignition and/or explosion may occur due to a contact between the anode and cathode, and shape retentivity may not be high.

Meanwhile, an external force may be applied to the battery 100 according to the embodiment of the present invention. Further, when the battery according to the present invention is implemented as a flexible battery, a pattern for shrinkage and relaxation in a length direction may be formed thereon. When a process of forming a pattern is performed or an external force is applied to the battery, there is a concern in that heaving may occur between the nano-web layer 116c and anode 116. Thus, as shown in FIG. 3, an adhesive web layer 116d may be formed on one surface of the nano-web layer 116c to attach the nano-web layers 116c to the upper and lower surfaces of the anode 116. The adhesive web layer 116d may be directly formed on the surface of the nano-web layer 116c through a process such as electrospinning or the like. As described above, the nano-web layers 116c on which the adhesive web layers 116d are formed may be attached to the upper and lower surfaces of the anode 116 by arranging the adhesive web layer 116d on the upper and lower surfaces of the anode 116.

The adhesive web layer 116d may include an adhesive fiber containing an acrylic-based adhesive and a polymer resin. Since the adhesive web layer 116d is formed to contain the adhesive fiber, the adhesive web layer 116d may be formed in a structure having pores.

The acrylic-based adhesive may employ a material without limitation as long as the material can be commonly used in the adhesive layer in the art, and most preferably, the acrylic-based adhesive may contain pentaerythritol ester of a wood resin as an adhesive component.

Further, the acrylic-based adhesive may further contain a solvent to be provided in a spinning solution as an acrylic-based adhesive composition. In this case, the acrylic-based adhesive composition may contain 5 to 35% by weight of the acrylic-based adhesive and 65 to 95% by weight of the solvent and, preferably, 10 to 30% by weight of the acrylic-based adhesive and 70 to 90% by weight of the solvent. When the adhesive component of the acrylic-based adhesive is less than 5% by weight or the solvent exceeds 95% by weight, adhesive performance of the adhesive web layer may not be high. When the adhesive component exceeds 35% by weight or the solvent is less than 65% by weight, the adhesive web layer is formed, then pores thereof are blocked, and thus ion exchange may not be easy. Further, the polymer resin may be used without limitation as long as it can be commonly fibrillated through electrospinning in the art. Preferably, a polymer resin containing PVDF may be used.

Meanwhile, the adhesive fiber may contain the acrylic-based adhesive ranging from 300 to 700 parts by weight and, preferably, 350 to 650 parts by weight based on 100 parts by weight of the polymer resin. When the acrylic-based adhesive contained in the composition is less than 300 parts by weight based on 100 parts by weight of the polymer resin, the formed adhesive web layer 116d may not exhibit an adhesive force at a desired level. When the acrylic-based adhesive contained in the composition exceeds 700 parts by weight based on 100 parts by weight of the polymer resin, the pores of the nano-web layer are blocked such that ion exchange may not be easy.

Further, a thickness of the adhesive web layer 116d may range from 0.5 to 5 μm and, preferably, 1 to 2 μm. When the thickness of the adhesive web layer 116d is less than 0.5 μm, a general battery is implemented, and an external force is applied to the general battery and/or a flexible battery is implemented, and a pattern is formed on the flexible battery, the nano-web layer 116c may be delaminated. When the thickness of the adhesive web layer 116d exceeds 5 μm, air porosity may be lowered.

Meanwhile, when the anode 116 having the nano-web layer 116c and the adhesive web layer 116d on both surfaces thereof is formed so as to manufacture the battery 100 according to the embodiment of the present invention, the anode 116 may be formed such that the composition is spun on one surface of a separately manufactured nano-web layer 116c to form a web-shaped adhesive web layer 116d, the adhesive web layer 116d is disposed in contact with the anode active material 116b thereabove and therebelow, and then a lamination process having an upper roll and a lower roll is performed at a temperature ranging from 70 to 100° C., and preferably, 80 to 90° C., to fix the respective layers.

Meanwhile, the upper roll and the lower roll may be used in the lamination process without limitation as long as they are rolls made of a material that can be commonly used in the art. Preferably, a steel roll may be used as the upper roll and the lower roll. When the lamination process is performed through the steel roll, a gap between the upper roll and the lower roll is important due to a characteristic of the steel roll having no elasticity. Accordingly, the anode 116 having the nano-web layer 116c and the adhesive web layer 116d may be manufactured by performing the lamination process in which a stacked part, in which an adhesive web layer is further disposed between the nano-web layer and an anode collector partially or entirely coated with an anode active material, passes through a roll gap between the upper roll and the lower roll, wherein the roll gap corresponds to 60 to 85% of a thickness of the stacked part and, preferably, 65 to 75% of the thickness thereof. When the roll gap is less than 60% of the thickness of the stacked part, the adhesive web layer may be melted to block the pores of the nano-web layer, and thus ion exchange may not be easy. When the roll gap exceeds 85% of the thickness of the stacked part, a desired level of adhesion may not be exhibited, and thus a contact between the anode and the cathode may not be prevented.

Figure 5:
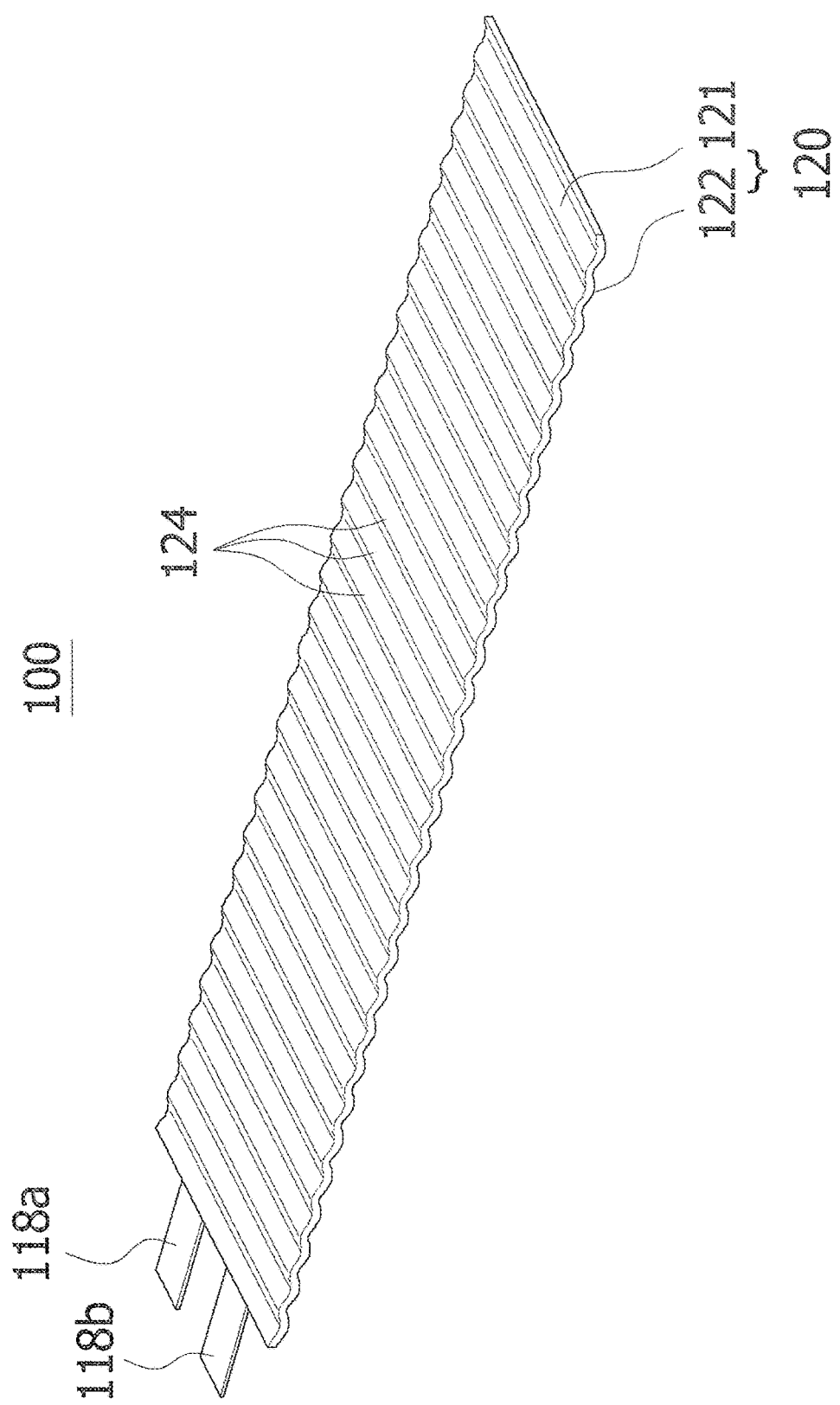
FIG. 5 is an overall schematic diagram illustrating the battery according to one embodiment of the present invention.
Figure 6:
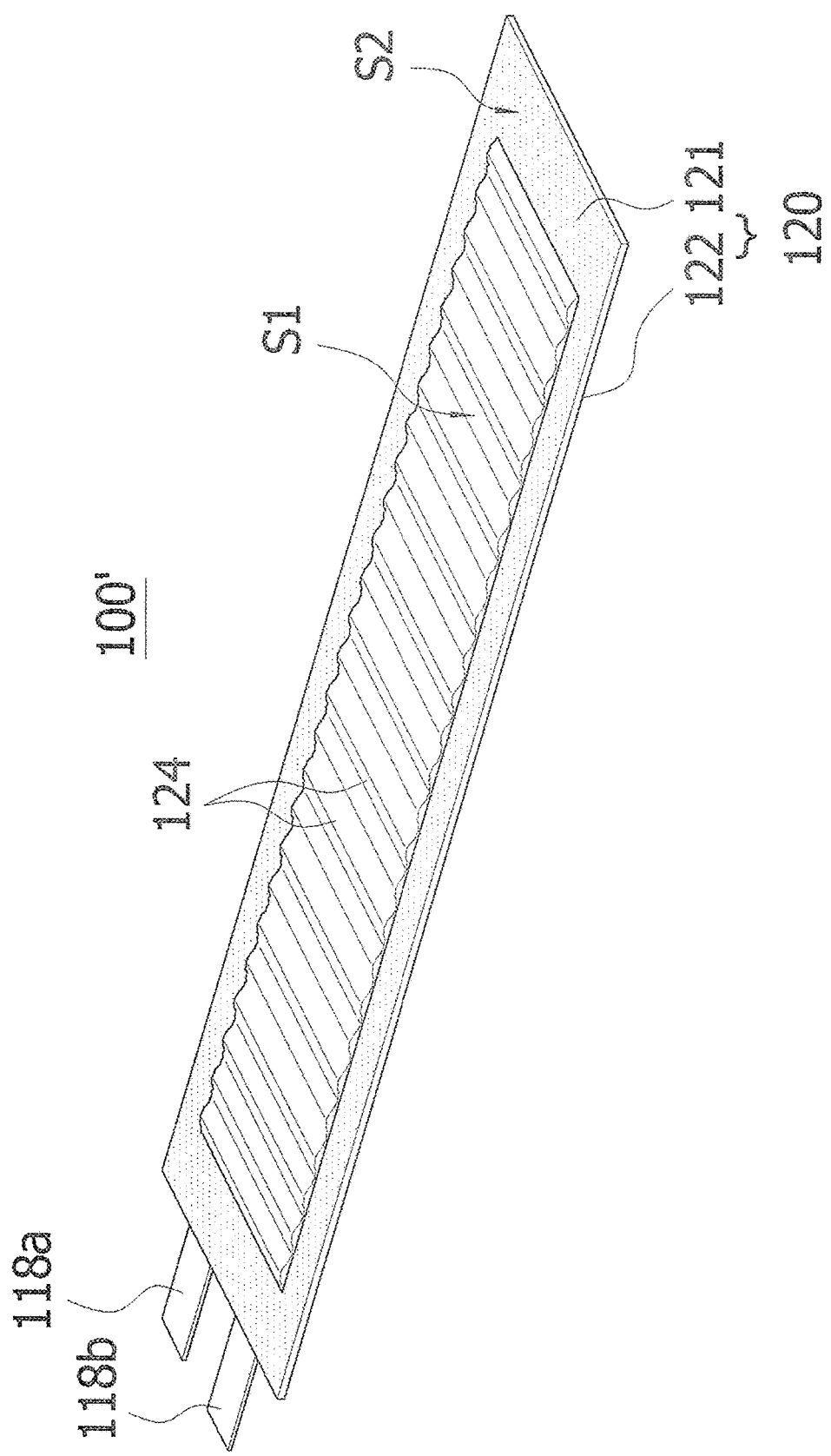
FIG. 6 is an overall schematic diagram illustrating a battery according to another embodiment of the present invention that shows a case in which a first pattern is formed on only an accommodation portion side of an exterior material.

Meanwhile, as shown in FIGS. 5 and 6, the battery according to the present invention may include an electrolyte and the exterior material 120 which encapsulates the above-described electrode assembly together with the electrolyte.

The exterior material 120 may be formed of a plate-shaped member having a predetermined area and may accommodate the electrode assembly and the electrolyte therein to protect the electrode assembly from an external force.

To this end, the exterior material 120 includes a pair of a first exterior material 121 and a second exterior material 122 and is sealed with an adhesive along an edge thereof to prevent the electrolyte and the electrode assembly, which are accommodated therein, from being exposed and leaking to the outside.

That is, the first exterior material 121 and the second exterior material 122 may include a first area S1, which forms an accommodation portion for accommodating the electrode assembly and the electrolyte, and a second area S2 which is disposed to surround the first area S1 and forms a sealing portion for preventing leakage of the electrolyte to the outside.

The edge of the exterior material 120, which constitutes the sealing portion, may be sealed with an adhesive after the first exterior material 121 and the second exterior material 122 are formed of two members. Alternatively, the first exterior material 121 and the second exterior material 122 may be formed of a single member, the half of the single member may be folded in a width direction or a length direction, and then the remaining portion of the single member in contact with each other may be sealed with an adhesive.

The exterior material 120 may be provided in the form in which metal layers 121b and 122b are interposed between first resin layers 121a and 122a and second resin layers 121c and 122c. That is, the exterior material 120 is made in the form in which the first resin layers 121a and 122a, the metal layers 121b and 122b, and the second resin layers 121c and 122c are sequentially stacked. The first resin layers 121a and 122a are disposed inward to be in contact with the electrolyte, and the second resin layers 121c and 122c are exposed to the outside.

In this case, the first resin layers 121a and 122a seal between the exterior materials 121 and 122 to serve as a bonding member which seals the electrolyte provided in the battery to prevent the electrolyte from leaking to the outside. The first resin layers 121a and 122a may be made of a material of a bonding member that is typically provided in an exterior material for a battery. Preferably, the first resin layers 121a and 122a may include a single layer structure among an acid modified polypropylene (PPa), cast polypropylene (CPP), linear low density polyethylene (LLDPE), low density polyethylene (LDPE), high density polyethylene (HDPE), polyethylene, polyethylene terephthalate, polypropylene, ethylenevinyl acetate (EVA), epoxy resin, and phenol resin, or a stacked structure thereof. Preferably, the first resin layers 121a and 122a may be made of a single layer selected from among PPa, CPP, LLDPE, LDPE, and HDPE, or made by stacking two or more thereof.

Further, an average thickness of each of the first resin layers 121a and 122a may range from 20 μm to 80 μm and, preferably, from 20 μm to 60 μm. When the average thickness of each of the first resin layers 121a and 122a is less than 20 μm, in the process of sealing edges of the first exterior material 121 and the second exterior material 122, a bonding force between the first resin layers 121a and 122a which are in contact with each other may be decreased or it may be disadvantageous in securing tightness for preventing leakage of the electrolyte. When the average thickness of each of the first resin layers 121a and 122a exceeds 80 μm, it may be uneconomical and disadvantageous in thinness.

The metal layers 121b and 122b are interposed between the first resin layers 121a and 122a and the second resin layers 121c and 122c to prevent moisture from infiltrating from the outside to the accommodation portion and prevent the electrolyte from leaking from the accommodation portion to the outside.

To this end, the metal layers 121b and 122b may be made of a dense metal layer so as to prevent moisture and the electrolyte from passing therethrough. The metal layers may be each formed of a foil type of metal thin plate or a metal deposition film which is formed on the second resin layers 121c and 122c, which will be described below, through a conventionally known method, e.g., sputtering, chemical vapor deposition, or the like. Preferably, the metal layers may be each formed of a metal thin plate. Thus, when a general battery is implemented and an external force is applied thereto and/or when a flexible battery is implemented and a pattern is formed thereon, cracks in the metal layers are prevented such that the electrolyte may be prevented from leaking to the outside and moisture may be prevented from infiltrating from the outside.

For example, each of the metal layers 121b and 122b may include one or more selected from among aluminum, copper, phosphor bronze (PB), aluminum bronze, cupronickel, beryllium-copper, chromium-copper, titanium-copper, iron-copper, a corson alloy, and a chromium-zirconium copper alloy.

A thickness of each of the metal layers 121b and 122b may range from 5 to 100 μm and, preferably, 30 to 50 μm, but the present invention is not limited thereto. When the thickness of each of the metal layers is less than 5 μm, moisture may infiltrate into the accommodation portion or the electrolyte in the accommodation portion may leak to the outside.

The second resin layers 121c and 122c are located on exposed surfaces of the exterior material 120 and serve to reinforce strength of the exterior material and to prevent occurrence of damage, such as a scratch, to the exterior material due to an externally applied physical contact.

Each of the second resin layers 121c and 122c may include one or more selected from among nylon, PET, cyclo olefin polymer (COP), polyimide (PI), and a fluorine-based compound, preferably, nylon or the fluorine-based compound.

Here, the fluorine-based compound may include one or more selected from among PTFE, perfluorinated acid (PFA), fluorinated ethylene propylene copolymer (FEP), polyethylene tetrafluoro ethylene (ETFE), PVDF, ethylene chlorotrifluoroethylene (ECTFE), and polychlorotrifluoroethylene (PCTFE).

In this case, an average thickness of each of the second resin layers 121c and 122c may range from 10 μm to 50 μm, preferably, 15 μm to 40 μm, and more preferably, 15 μm to 35 μm. When the average thickness of each of the second resin layers 121c and 122c is less than 10 μm, mechanical and physical characteristics may not be secured. When the average thickness of each of the second resin layers 121c and 122c exceeds 50 μm, it is advantageous in securing the mechanical and physical characteristics but it is uneconomical and disadvantageous in thinness.

Meanwhile, the batteries 100 and 100' according to the present invention may further include an adhesive layer between the metal layers 121b and 122b and the first resin layers 121a and 122a.

The adhesive layer serves to increase adhesive strength between the metal layers 121b and 122b and the first resin layers 121a and 122a and prevents the electrolyte accommodated in the exterior material from reaching the metal layers 121b and 122b of the exterior material. Thus, the adhesive layer may prevent the metal layers 121b and 122b from being corroded due to an acidic electrolyte and/or prevent delamination of the first resin layers 121a and 122a and the metal layers 121b and 122b. Further, even when a problem, such as abnormal overheating, occurs during use of the batteries 100 and 100' and thus the batteries 100 and 100' are expanded, the adhesive layer may prevent leakage of the electrolyte to provide reliability for safety.

The adhesive layer may be formed of a material that is similar to those of the first resin layers 121a and 122a so as to improve adhesive strength due to compatibility with the first resin layers 121a and 122a. For example, the adhesive layer may include one or more selected from among silicon, polyphthalate, PPa, and acid modified polyethylene (Pea).

In this case, an average thickness of the adhesive layer may range from 5 μm to 30 μm and, preferably, 10 μm to 20 μm. When the average thickness of the adhesive layer is less than 5 μm, it may be difficult to secure stable adhesive strength. When the average thickness of the adhesive layer exceeds 30 μm, it may be disadvantageous in thinness.

Further, the batteries 100 and 100' according to the present invention may further include a dry laminate layer (not shown) between the metal layers 121b and 122b and the second resin layers 121c and 122c.

The dry laminate layer serves to bond the metal layers 121b and 122b to the second resin layers 121c and 122c. The dry laminate layer may be formed by drying a known water-based and/or oil-based organic solvent type adhesive.

In this case, an average thickness of the dry laminate layer may range from 1 μm to 7 μm, preferably, 2 μm to 5 μm, and more preferably, 2.5 μm to 3.5 μm. When the average thickness of the dry laminate layer is less than 1 μm, adhesive strength is weak such that delamination between the metal layers 121b and 122b and the second resin layers 121c and 122c may occur. When the average thickness of the dry laminate layer exceeds 7 μm, the thickness of the dry laminate layer is unnecessarily increased, and thus, when a flexible battery is implemented, the dry laminate layer may adversely affect formation of a pattern.

Meanwhile, the electrolyte which is encapsulated with the electrode assembly in the exterior material may be used without limitation as long as it is a liquid electrolyte which is conventionally used in the art.

For example, the electrolyte may be an organic electrolyte containing a non-aqueous organic solvent and a lithium salt solute. Here, carbonate, ester, ether, or ketone may be used as the non-aqueous organic solvent. Dimethyl carbonate (DMC), diethyl carbonate (DEC), dipropyl carbonate (DPC), methyl propyl carbonate (MPC), ethyl propylcarbonate (EPC), methyl ethyl carbonate (MEC), ethylene carbonate (EC), propylene carbonate (PC), butylene carbonate (BC), and the like may be used as the carbonate, butyrolactone (BL), decanolide, valerolactone, mevalonolactone, caprolactone, n-methyl acetate, n-ethyl acetate, n-propyl acetate, and the like may be used as the ester, dibutyl ether or the like may be used as the ether, and the ketone includes polymethyl vinyl ketone, but the present invention is not limited to the type of the non-aqueous organic solvent.

Further, the electrolyte used in the present invention may include a lithium salt. The lithium salt serves as a supply source of lithium ions in the battery to allow a basic operation of a lithium battery. Examples of the lithium salt include one or more selected from the group consisting of $LiPF_6$, $LiBF_4$, $LiSbF_6$, $LiAsF_6$, $LiClO_4$, $LiCF_3SO_3$, LiN $(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (here, x and y are rational numbers), and $LiSO_3CF_3$, or a mixture thereof.

In this case, the electrolyte used in the batteries 100 and 100' according to the present invention may be a conventional liquid electrolyte. However, preferably, a gel polymer electrolyte may be used so that, when an external force is applied or bending occurs, which may occur in the battery having a liquid electrolyte, leakage of a gas and a liquid may be prevented.

The gel polymer electrolyte may be formed by gelling and performing heat treatment on a non-aqueous organic solvent, a solute of lithium salt, and an organic electrolyte solution containing a polymerization initiator and a monomer for forming a gel polymer. The gel polymer electrolyte may be formed by performing heat treatment on the organic electrolyte alone. However, the gel polymer electrolyte may be implemented in the form in which, in a state in which the separation membrane provided inside the battery is impregnated in the organic electrolyte, the organic electrolyte is heat-treated and the monomer is in-situ polymerized so that pores of the separation membrane 114 are wetted with a gel polymer in a gel state. The in-situ polymerization reaction in the battery may be carried out through thermal polymerization, a polymerization time may be about 20 minutes to 12 hours, and the thermal polymerization may be carried out at a temperature ranging from 40 to 90° C.

In this case, the monomer for forming a gel polymer may employ any monomer as long as a polymer is a monomer forming a gel polymer while the polymerization reaction is performed by a polymerization initiator. For example, examples of the monomer may include a monomer with respect to methyl methacrylate (MMA), PEO, polypropylene oxide (PPO), PAN, PVDF, polymethacrylate (PMA), PMMA, and a polymer thereof, or polyacrylate having two or more functional groups such as polyethyleneglycol dimethacrylate or polyethyleneglycol acrylate.

Further, examples of the polymerization initiator may include organic peroxides or hydroperoxides such as benzoyl peroxide, acetyl peroxide, dilauryl peroxide, di-tert-butylperoxide, cumyl hydroperoxide, hydrogen peroxide, and the like, and azo compounds such as 2,2-azobis(2-cyanobutane), 2,2-azobis(methylbutyronitrile), and the like. The polymerization initiator is decomposed due to heat to form a radical and reacts with the monomer due to polymerization of a free radical to form a gel polymer electrolyte, i.e., a gel polymer.

The monomer for forming a gel polymer is preferably used ranging from 1 to 10% by weight based on the organic electrolyte. When a content of the monomer is less than 1% by weight, it is difficult to form a gel electrolyte, and when the content of the monomer exceeds 10% by weight, there is a problem of degrading a service life. Further, the polymerization initiator may be included ranging from 0.01 to 5% by weight based on the monomer for forming a gel polymer.

Figure 7:
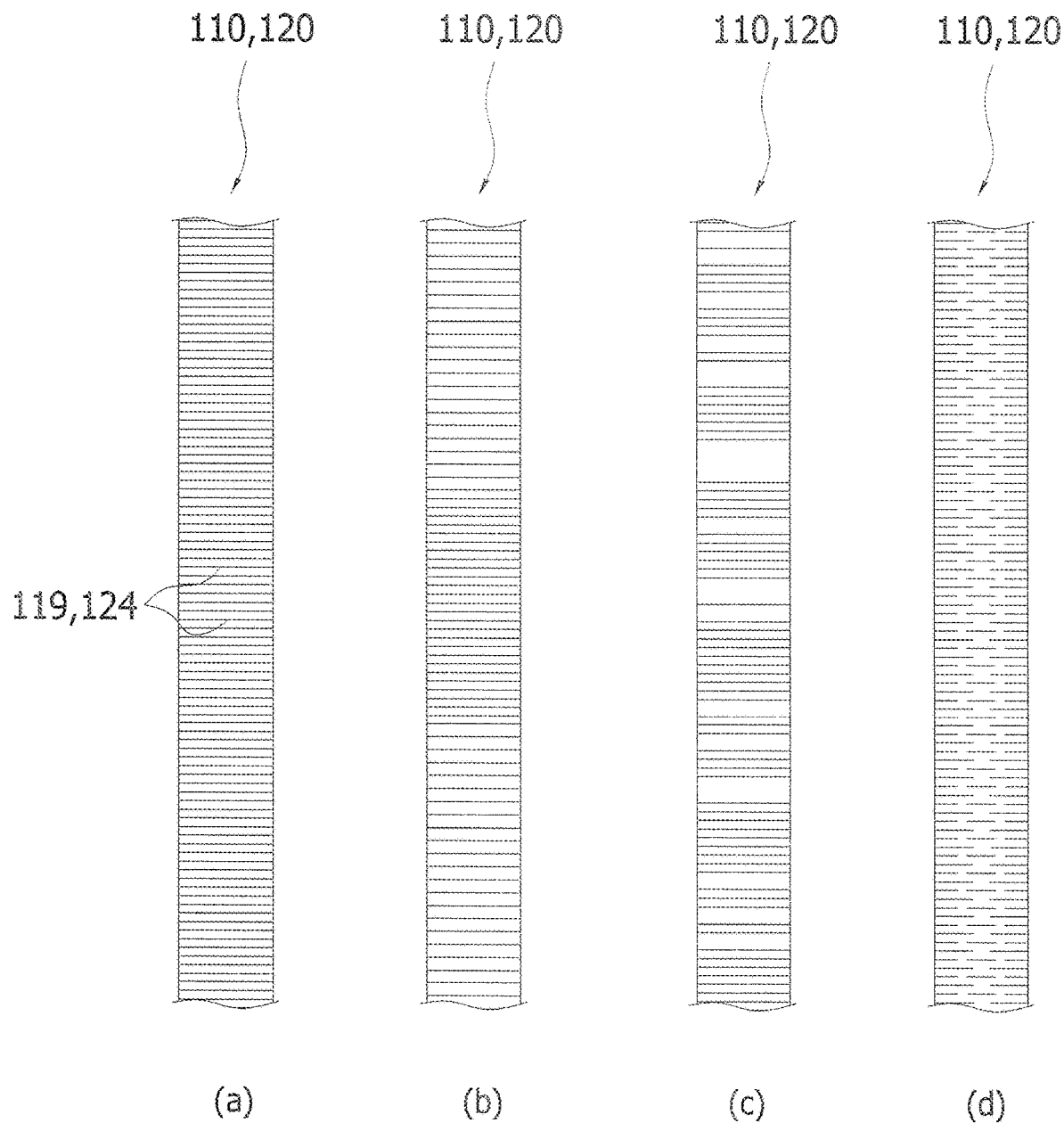
FIG. 7 is an exemplary view illustrating various patterns applied to an electrode assembly and an exterior material in the battery according to one embodiment of the present invention that shows a case in which the patterns are formed consecutively or intermittently with respect to an entirety of a length.

Meanwhile, as shown in FIG. 7, the electrode assembly 110 and the exterior material 120, which are included in the batteries 100 and 100' according to the present invention, may have patterns 119 and 124 for shrinkage and relaxation in the length direction during bending so as to be implemented as a flexible battery. A first pattern 124 formed on the exterior material 120 and a second pattern 119 formed on the electrode assembly 110 may be provided to have the same orientation.

When the battery 100 is bent, the patterns 119 and 124 offset a variance in length generated due to a variation in curvature at a bent portion of the battery 100, thereby preventing or minimizing shrinkage or relaxation of a base material.

Consequently, an amount of deformation of the base material constituting the electrode assembly 110 and the exterior material 120 is prevented or minimized Accordingly, even when the electrode assembly 110 and the exterior material 120 are implemented as a flexible battery and repetitive bending occurs, the amount of deformation of the base material, which may occur locally at the bent portion, is minimized such that it is possible to prevent the electrode assembly 110 and the exterior material 120 from being locally damaged or prevent degradation in performance of the electrode assembly 110 and the exterior material 120 due to the bending.

In this case, the first pattern 124 and the second pattern 119 may be disposed not only to have the same orientation but also to coincide with each other. Consequently, the first pattern 124 and the second pattern 119 are made to always perform the same behavior. Even when the bending occurs and the first pattern 124 and the second pattern 119 return to their original states, the first pattern 124 and the second pattern 119 may remain in the original states.

Meanwhile, ridges and valleys of the first pattern 124 and the second pattern 119 are formed in a direction parallel to a width direction of the exterior material 120 and electrode assembly 110. The ridges and valleys of the first pattern 124 and the second pattern 119 may be alternatively disposed in a length direction of the exterior material 120 and electrode assembly 110. Further, the ridges and the valleys constituting the first pattern 124 and the second pattern 119 may be formed at the same position in groups of the ridges and the valleys.

Specifically, the ridges and the valleys of the first pattern 124 and the second pattern 119 are formed in a direction parallel to a straight line parallel to the width direction of the exterior material 120 and the electrode assembly 110 and are repetitively disposed in the length direction thereof (see FIGS. 5 and 6).

In this case, the patterns 119 and 124 may be continuously or intermittently formed in a direction parallel to the width direction of the electrode assembly 110 and the exterior material 120 (see FIG. 7) or entirely or partially formed with respect to lengths of the electrode assembly 110 and the exterior material 120.

Meanwhile, a reference for the content with respect to the patterns according to the present invention will be made to Korean Patent Registration No. 10-1680592 by the inventors of the present invention, and thus a detailed description thereof will be omitted.

Meanwhile, porous nano-web layers are provided in the battery according to the present invention so that, even when a temperature in the battery rises and thus shrinkage or melting of a separation membrane occurs, a contact between a cathode and an anode is prevented such that ignition and/or explosion cannot occur, ion exchange cannot be disturbed, and thus degradation of battery performance can be prevented. Further, the nano-web layer of the battery according to the present invention cannot be melted and released to the separation membrane even at a high temperature, and, even when an external force is applied to the battery, occurrence of cracks can be prevented, and, even when an repetitive external force such as a repetitive vibration is applied, degradation in physical characteristics required as a battery can be prevented or minimized. The battery according to the present invention can be applied not only to wearable devices such as smart watches, watch straps, and the like but also a variety of electronic devices such as a rollable display and the like which require flexibility of a battery.

Modes of the Invention

Although the present invention will be described in more detail with reference to the following examples, the following examples are not intended to limit the scope of the present invention and they should be construed as aiding in the understanding of the present invention.

EXAMPLE 1

Manufacture of Electrode Assembly

In order to manufacture an electrode assembly, a cathode collector and an anode collector were prepared first. A cathode was manufactured by casting NCM-based cathode active materials on both surfaces of the cathode collector, which is made of aluminum and has a thickness of 20 µm, so as to obtain a final thickness of 120 µm. Further, the anode was manufactured such that graphite anode active materials were first cast on both surfaces of an anode collector, which is made of copper and has a thickness of 15 µm, so as to obtain a final thickness of 115 µm. Further, a spinning solution containing dimethylacetamide as a solvent and 12 parts by weight of PAN based on 100 parts by weight of the solvent was electrospun onto a support to form a nano-web in a condition in which a diameter of a discharge outlet was 25 G, a relative humidity was 35%, a discharge amount was 15 µl/min/hole, a voltage was 97 kV, a top dead center (TDC) was 20 cm, and an air pressure was 0.05 MPa. Then, a composition in which 500 parts by weight of an acrylic-based adhesive (DURO-TAK 80-151A, Henkel) was mixed with 100 parts by weight of PVDF was electrospun onto one surface of the formed nano-web to form an adhesive web in a condition in which the diameter of the discharge outlet was 25 G, the relative humidity was 50%, the discharge amount was 20 µl/min/hole, the voltage was 70 kV, the TDC was 20 cm, and the air pressure was 0.05 MPa and then the adhesive web was disposed adjacent to the anode active material, thereby manufacturing a stacked part. Further, a lamination process having an upper roll and a lower roll was performed at a temperature of 90° C. to finally manufacture an anode having nano-web layers and adhesive layers on both surfaces thereof. In this case, a roll gap between the upper roll and the lower roll was 70% with respect to a thickness of the stacked part. Further, in this case, each of the nano-web layers provided on the manufactured anode has a thickness of 5 µm, air porosity of 50%, and a basis weight of 2 g/m$^2$, and a thickness of each of the adhesive web layers was 1.1 µm.

Thereafter, a separation membrane made of a PP material and having a thickness of 16 µm was prepared. As shown in FIG. 1, the continuous separation membrane was provided between the cathode and the anode or provided and bent to surround one end of the cathode or the anode so that the electrode assembly was manufactured by alternatively stacking three cathodes, four anodes, and one separation membrane.

EXAMPLES 2 TO 16 AND COMPARATIVE EXAMPLE

An electrode assembly was manufactured in the same manner as in Example 1, wherein the electrode assembly in Tables 1 to 3 was manufactured such that the basis weight and the thickness of the nano-web layer, the thickness of the adhesive web layer, the gap between the upper and lower rolls in the lamination process, whether the adhesive web layer was included, whether the continuous separation membrane was used, and whether the nano-web layer was included were changed according to Tables 1 to 3.

TEST EXAMPLE 1

Evaluation of Pore Retentivity

When initial air porosity of the nano-web layer was 100 with respect to the electrode assembly manufactured in Examples and Comparative Example, a ratio of air porosity, after the adhesive web layer was formed, to the initial air porosity of the nano-web layer was evaluated and shown in Tables 1 to 3.

TEST EXAMPLE 2

First, a metal layer made of aluminum and having a thickness of 30 µm was prepared. A first resin layer made of CPP and having a thickness of 40 µm was formed on one surface of the metal layer, and a second resin layer made of a nylon film and having a thickness of 10 µm was formed on the other side of the metal layer. In this case, an acid modified polypropylene layer containing 6% by weight of acrylic acid in a copolymer was interposed with a thickness of 5 µm between the first resin layer and the metal layer so that an exterior material having a total thickness of 85 µm was manufactured.

Thereafter, the first resin layer of the prepared exterior material was folded to be an inner surface, and then each of the electrode assemblies manufactured according to Examples and Comparative Examples was disposed inside the exterior material so as to allow the folded first resin layer of the exterior material to be brought into contact with the electrode assembly. The electrode assembly was thermo-compressed at a temperature of 150° C. for 10 seconds except for a portion through which an electrolyte is input. Then, a typical electrolyte for a lithium ion secondary battery was put into the portion, and the portion through which the electrolyte was injected was sealed by thermo-compression bonding at a temperature of 150° C. for 10 seconds. Thereafter, an external force was applied to form a battery on which a wavy pattern was formed.

Further, the following physical characteristics were evaluated and shown in Tables 1 to 3.

1. Evaluation of Ignition Occurrence Temperature

For each battery having the electrode assembly manufactured according to Examples and Comparative Example, a temperature at which ignition phenomenon occurred in the battery was evaluated by raising a temperature from 25° C. to 250° C. at a temperature rise rate of 5° C./min. In this case, a temperature at which ignition occurs was evaluated such that a case in which the ignition did not occur even at 250° C. or higher was indicated as ⊚, a case in which the ignition occurred at a temperature of 240° C. or higher and less than 250° C. was indicated as ○, a case in which the ignition occurred at a temperature of 200° C. or higher and less than 240° C. was indicated as Δ, and a case in which the ignition occurred a temperature of less than 200° C. was indicated as x.

2. Evaluation of Delamination Prevention of Nano-Web Layer

A process of forming a pattern was performed while manufacturing batteries having the electrode assemblies manufactured according to Examples and Comparative Example, and then delamination prevention of the nano-web layer was evaluated such that a case in which delamination of the nano-web layer did not occur was indicated as ○, and a case in which delamination of the nano-web layer occurred was indicated as x.

TABLE 1

| | Items | Example 1 | Example 2 | Example 3 | Example 4 | Example 5 |
|---|---|---|---|---|---|---|
| Nano-web layer | Basis weight (g/m2) | 2 | 1.2 | 1.7 | 4 | 4.4 |
| | Thickness (μm) | 5 | 1 | 4 | 13 | 17 |
| | Whether to include | ○ | ○ | ○ | ○ | ○ |
| adhesive web layer | Thickness (μm) | 1.1 | 1.3 | 1.2 | 1.0 | 0.7 |
| | Whether to include | ○ | ○ | ○ | ○ | ○ |
| Lamination process | Ratio of gap between rolls to stacked part (%) | 70 | 70 | 70 | 70 | 70 |
| Separation membrane | Whether to use continuous separation membrane | ○ | ○ | ○ | ○ | ○ |
| Electrode assembly | Pore retentivity (%) | 92 | 88 | 92 | 93 | 93 |
| Battery | Evaluation of ignition occurrence temperature | ◉ | Δ | ◉ | ◉ | ○ |
| | Evaluation of delamination prevention of nano-web layer | ○ | X | ○ | ○ | X |

TABLE 2

| | Items | Example 6 | Example 7 | Example 8 | Example 9 | Example 10 |
|---|---|---|---|---|---|---|
| Nano-web layer | Basis weight (g/m2) | 1.6 | 1.9 | 2 | 2.2 | 2 |
| | Thickness (μm) | 3.8 | 4.4 | 5.2 | 5.7 | 5.1 |
| | Whether to include | ○ | ○ | ○ | ○ | ○ |
| adhesive web layer | Thickness (μm) | 0.8 | 1.0 | 1.2 | 1.4 | 0.3 |
| | Whether to include | ○ | ○ | ○ | ○ | ○ |
| Lamination process | Ratio of gap between rolls to stacked part (%) | 50 | 65 | 75 | 90 | 70 |
| Separation membrane | Whether to use continuous separation membrane | ○ | ○ | ○ | ○ | ○ |
| Electrode assembly | Pore retentivity (%) | 67 | 90 | 92 | 92 | 90 |
| Battery | Evaluation of ignition occurrence temperature | ○ | ◉ | ○ | Δ | Δ |
| | Evaluation of delamination prevention of nano-web layer | ○ | ○ | ○ | X | X |

TABLE 3

| | Items | Example 11 | Example 12 | Example 13 | Example 14 | Comparative Example 1 |
|---|---|---|---|---|---|---|
| Nano-web layer | Basis weight (g/m2) | 2 | 1.9 | 2 | 2 | — |
| | Thickness (μm) | 4.8 | 4.6 | 5.2 | 5 | — |
| | Whether to include | ○ | ○ | ○ | ○ | X |

TABLE 3-continued

| | Items | Example 11 | Example 12 | Example 13 | Example 14 | Comparative Example 1 |
|---|---|---|---|---|---|---|
| adhesive web layer | Thickness (μm) | 2 | 7 | — | 1.1 | — |
| | Whether to include | ○ | ○ | X | ○ | — |
| Lamination process | Ratio of gap between rolls to stacked part (%) | 70 | 70 | 70 | 70 | 70 |
| Separation membrane | Whether to use continuous separation membrane | ○ | ○ | ○ | X | ○ |
| Electrode assembly | Pore retentivity (%) | 93 | 78 | — | 92 | — |
| Battery | Evaluation of ignition occurrence temperature | ◉ | ◉ | Δ | Δ | X |
| | Evaluation of delamination prevention of nano-web layer | ○ | ○ | X | ○ | — |

As can be seen in Tables 1 to 3, when Examples 1, 3, 4, 7, 8, 11, which satisfied all of the basis weight and the thickness of the nano-web layer, the thickness of the adhesive web layer, the roll gap between the upper and lower rolls of the lamination process, whether to include the adhesive web layer, whether to use the continuous separation membrane, and whether to include the nano-web layer were compared with Examples 2, 5, 6, 9, 10, and 12 to 14 and Comparative Example 1 in which any one among the above-described items was excluded, owing to a small number of pores being blocked, a reduction rate of pores being low, the ignition occurrence temperature being high, and, simultaneously, delamination of the nano-web layer not occurring.

Although the exemplary embodiments of the present invention have been described above, the spirit of the present invention is not limited to the exemplary embodiments disclosed herein, and it should be understood that numerous other embodiments can be devised by those skilled in the art that will fall within the same spirit and scope of this invention through addition, modification, deletion, supplement, and the like of a component, and also these other embodiments will fall within the spirit and scope of the present invention.

The invention claimed is:

1. A battery comprising:
an electrode assembly including a cathode having a cathode collector which is partially or entirely coated with a cathode active material, an anode having two surfaces and comprising an anode collector which is partially or entirely coated with an anode active material, and a separation membrane interposed between the cathode and the anode;
an electrolyte;
an exterior material configured to encapsulate the electrolyte together with the electrode assembly; and
a nano-web layer disposed on both surfaces of the anode,
wherein the nano-web layer comprises at least one selected from the group consisting of a swellable polymer, a non-swellable polymer, a heat resistant polymer, and mixed polymers thereof,
wherein a melting point of the nano-web layer is in a range of 260° C. to 300° C.,
wherein the nano-web layer is fixed through an adhesive web layer comprising an adhesive fiber,
wherein the adhesive web layer is interposed between the nano-web layer and the anode collector,
wherein the nano-web layer is formed in a structure having pores, and
wherein the adhesive fiber comprises a polymer resin containing polyvinylidene fluoride (PVDF); and an acrylic-based adhesive.

2. The battery of claim 1, wherein a thickness of the adhesive web layer ranges from 0.5 μm to 5 μm.

3. The battery of claim 1, wherein the adhesive fiber contains the acrylic-based adhesive ranging from 300 to 700 parts by weight based on 100 parts by weight of the polymer resin.

4. The battery of claim 1, wherein the anode is formed by performing a lamination process in which a stacked part, in which an adhesive web layer is further disposed between the nano-web layer and the anode collector partially or entirely coated with an anode active material, passes through a roll gap between an upper roll and a lower roll, wherein the roll gap corresponds to 60 to 85% of a thickness of the stacked part.

5. The battery of claim 1, wherein a basis weight of the nano-web layer is greater than or equal to 1.5 g/m².

6. The battery of claim 1, wherein a thickness of the nano-web layer ranges from 3 μm to 15 μm.

7. The battery of claim 1, wherein air porosity of the nano-web layer ranges from 20% to 70%.

8. The battery of claim 1, wherein the nano-web layer is formed of nanofibers which have an average diameter ranging from 100 nm to 1000 nm and contain a polyacrylonitrile (PAN) material.

9. The battery of claim 1, wherein each of the cathode active material and the anode active material contains one or more selected from the group consisting of polyvinylidene fluoride (PVDF) and polytetrafluoroethylene (PTFE), which serve as a binder to prevent delamination of the cathode active material and the anode active material from the cathode collector and the anode collector, respectively, in a range of 4 to 8% by weight based on a total weight of each of the cathode active material and the anode active material.

10. The battery of claim 1, wherein a thickness of the cathode collector ranges from 10 to 30 μm, and a thickness of the anode collector ranges from 3 to 18 μm.

11. The battery of claim 1, wherein the separation membrane is provided such that a continuous separation membrane surrounds one end of the anode and one end of the cathode in a direction opposite to the one end of the anode.

12. The battery of claim 1, wherein:
the exterior material is formed by sequentially stacking a first resin layer, a metal layer, and a second resin layer; and the second resin layer is exposed to the outside.

13. The battery of claim 1, wherein, each of the electrode assembly and the exterior material is formed such that patterns for shrinkage and relaxation in a length direction are formed to have the same orientation during bending,
wherein the patterns include:
a first pattern formed on at least one surface of the exterior material; and
a second pattern formed on the electrode assembly in the same direction as the first pattern and disposed to coincide with the first pattern.

14. A mobile electronic device comprising the battery according to claim 1.

* * * * *